United States Patent [19]

van Heuven et al.

[11] 4,077,885
[45] Mar. 7, 1978

[54] COMPOSITE DYNAMIC MEMBRANE

[75] Inventors: Jan Willem van Heuven, Apeldoorn; Roelof Karl Bloebaum, Vaassen, both of Netherlands

[73] Assignee: Nederlandse Organisatie voor Toegepast-Natuurwetenschappelijk Onderzoek, The Hague, Netherlands

[21] Appl. No.: 640,067

[22] Filed: Dec. 12, 1975

[30] Foreign Application Priority Data

Dec. 20, 1974 Netherlands .......................... 7416645

[51] Int. Cl.$^2$ ............................................. B01J 31/00
[52] U.S. Cl. .................................. 210/193; 210/23 H; 210/433 M; 210/500 M
[58] Field of Search ................. 210/23, 500 M, 321 R, 210/75, 193, 433 M

[56] References Cited

U.S. PATENT DOCUMENTS

| | | | |
|---|---|---|---|
| 3,252,270 | 5/1966 | Pall et al. ................................. | 55/74 |
| 3,449,245 | 6/1969 | Johnson et al. ............. | 210/500 M X |
| 3,462,362 | 8/1969 | Kollsman .............................. | 210/23 |
| 3,556,305 | 1/1971 | Shorr ........................... | 210/500 M X |
| 3,855,133 | 12/1974 | Roehsler ...................... | 210/500 M X |
| 3,892,665 | 7/1975 | Steigelmann et al. ...... | 210/500 M X |

*Primary Examiner*—Frank A. Spear, Jr.
*Attorney, Agent, or Firm*—Hammond & Littell

[57] ABSTRACT

A composite dynamically formed membrane is described comprising an intermediate layer between a solid porous supporting material and the layer of forming particles.

In forming the composite dynamic membrane an intermediate layer of inert material which is either granular or fibrous, is deposited on a substantially tubular porous supporting device and on this there is deposited a second layer of an inert material, the ratio of the particle diameters between the second and the first layer being between 1:10 and 1:1,000.

The fine particles for this second layer may be blended with the particles of membrane forming material.

Dynamic membranes are employed in reverse osmosis, which more in particular is widely used for the desalination of aqueous liquids.

6 Claims, No Drawings

COMPOSITE DYNAMIC MEMBRANE

BACKGROUND OF THE INVENTION

The invention relates to a device for effecting reverse osmosis, provided with a composite dynamic membrane, which comprises a porous supporting device, an intermediate layer of a material that is hardly or not deformable, which layer may also be a multi-layer, and a layer of membrane-forming material. The invention also relates to a method for preparing such a membrane.

The application of such an intermediate layer of a material that is hardly or not deformable has important advantages. If the membrane-forming material should be deposited on the porous supporting layer directly then this supporting layer must have very fine pores, as otherwise the membrane-forming material passes through the pores or deposits in the pores, so that no or unsufficient membrane-forming on the surface of the supporting layer takes place. A supporting layer with very fine pores has as drawbacks, however, that the material of the supporting layer is expensive and that the colloidal particles cause a clogging of this layer that can hardly or not be removed. These drawbacks may be removed by applying between the supporting layer and the membrane-forming material a layer that has smaller pores than the supporting layer, so that after all a supporting layer with relatively large pores can be used. The porous supporting device mostly employed is a set of tubes of porous ceramic material.

This intermediate layer, which forms the substratum for the membrane-forming material, must meet some conditions;

Firstly, the material of the intermediate layer must be hardly or not deformable; secondly, the structure must be such that a flux through the composite membrane that is as great as possible, is attained and thirdly, when particles are used as a membrane-forming material, as little leakage as possible must occur between the membrane particles and the intermediate layer.

In the dynamically formed membranes known so far in this field of art that are provided with one intermediate layer, all these three conditions are not met simultaneously. It is also known in the art that an intermediate layer has been applied that is composed of three layers, having a ratio of the respective particle diameters of 1:2:3, the layer with the largest particle diameter lying on the supporting layer. As a result, the pores are not reduced in size sufficiently, however, so as to obtain an adequate membrane in all cases.

The best result has been obtained so far by applying instead of an intermediate layer, a membrane filter, e.g. comprising paper, fabric or microporous plastic, but nevertheless, the properties of such a membrane filter are also far from optimum, whereas, moreover, a membrane formed in such a way cannot be rinsed any longer.

SUMMARY OF THE INVENTION

It is the object of the invention to provide an improved composite dynamic membrane of the above type and it is characterized in that on the intermediate layer there is positioned a layer of inert granular material, the ratio between the particle diameter of this material and of that of the intermediate layer being between 1:10 and 1:1,000.

DETAILED DESCRIPTION OF THE INVENTION

As a membrane material, all materials can be used that form a selectively permeable layer on the interface. These may be both small particles, such as very finely dispersed ion exchangers and soluble macromolecules, such as the polyelectrolytes, polyacrylic acid and, sodium alginate.

As a granular material on the intermediate layer substances such as fine silicon dioxide or carbon black may be employed. Very suitable for the purpose is, for instance, silicon dioxide obtained by flame hydrolysis of silicon fluoride, commercially known as "Aerosil". This material is, depending on the membrane material used, situated on the intermediate layer either as a single layer or as a combined layer blended with the membrane material. For it has been found that in case of substances, such as sodium alginate, applied as the simple membrane layer, no selectively permeable layer is formed, but that such a layer is formed if sodium alginate is used blended with the above-mentioned granular material into a mixed layer.

The intermediate layer may consist of particle material or fibrous material. In the first case the ratio between the particle diameter of the granular material and that of the intermediate layer, preferably, is between 1:50 and 1:1,000 and in the second case the ratio between the particle diameter of the granular material and that of the fibre diameter of the intermediate layer is between 1:10 and 1:1,000.

For the intermediate layer which is known per se in the art, various type of filter aids can be applied, such as diatomaceous earth, glass-like silicates, glass fibres, asbestos fibres, etc. As a porous supporting layer, for instance, ceramic, plastic or glass fibre materials can be used. Mostly they are employed in the form of small tubes.

The dynamically formed membranes, composed according to the invention, are substantially leak-proof and in all cases meet the three conditions already stated above in comparative examples.

DESCRIPTION OF PREFERRED EMBODIMENTS

The comparative examples below relate to tests that have been carried out in a semi-technical installation, in which the reverse osmosis-unit comprises a porous ceramic tube, mounted in a metal pressure tube of the flexible type. The reverse osmosis-unit is placed in a closed circuit, in which a circulating pump and a delivery meter are inserted. A pneumatically driven plunger is used both for bringing the system to pressure and for addition of the production and drain flows. The flow of liquid is such that it goes through the ceramic tube from the outside to the inside, causing the membrane to be formed on the outside of the ceramic tube. As a supporting tube a porous ceramic tube was used, having a length of 0.25 m, a diameter of $3.10^{-2}/5.10^{-2}$ m, and having an average pore size of 18 $\mu$ and a surface of $3.93.10^{-2}$ m$^2$. The volume of the system is approx. 25 l. The equipment, made of stainless steel, is such that the conditions of flow at the reverse osmosis membrane are well known.

In general the tests were carried out as follows. With the aid of the pressure pump the circuit was filled from a feed vessel filled with 50 l of demineralized water. The drain discharge was closed and then the material for the layer having the largest particle size was added to the feed. This material was deposited on the supporting tube in 30 minutes, without the system fluid circulating. Hereafter, the very small particles for the second layer were added to the feed. After another 30 minutes the membrane material was finally added.

It should be observed that applying the various layers can also be carried out both without and with circulation of the system fluid.

The water flux of the two-layer-couple formed at that moment amounted to approx. $150.10^{-5}$ m/s at a system pressure of 10 to $15.10^5 N/m^2$. After a system pressure of $50.10^5 N/m^2$ has been reached, the circulating pump was started and NaCl added to the feed. Drain and product were fed back to the feed vessel.

By means of conductivity measurements the NaCl-concentrations in product and drain were determined.

The salt retention measured ($R_m$) of the membrane formed was defined as follows $$R_m = 1 - C_p/C_s$$

$R_m$ = salt retention measured
$C_p$ = concentration in the product
$C_s$ = concentration in feed.

EXAMPLE I

As a membrane material was used the highly acid cation exchanger "Dowex 50W-X8", made by Dow Chemical Co. The commercial material was dried, ground in a ball mill and then fractionated with a zig-zag sifter. For the tests the fraction, having a particle size smaller than 5 μm and on an average approx. 2 μm, was used.

In this Example it was determined in how far the whether or no circulation of the system fluid during the formation of the intermediate layers affects the membrane properties.

For the intermediate layer having the largest particle diameter Diatomite 215 (diatomaceous earth made by "Dicalite"/California), having an average particle size of 2.7 μm, and for that with the smallest particle size "Aerosil 200" (silicon dioxide, made by Degussa/Frankfort), having an average particle size of 12 nm. So, a ratio of 1:225.

For comparison, also a test was carried out with a membrane filter that has been mounted around the ceramic tube instead of the two intermediate layers.

A "Millipore" filter, type GSWP, having an average pore-size of 0.22 μm, was tested, made of blended cellulose esters (which filter is made by Millipore Corporation, Bedford, Great Britain).

TABLE A

1st layer: 1 gm. of Diatomite 215
2nd layer: 0.3 gm. of Aerosil 200
Operating Pressure: $50 \times 10^5 N/m^2$
NaCl conc.: 2.8 kg/m³
Temperature: 10 – 20° C.

| Formation of intermediate layer | Membrane properties after 3 hours | |
|---|---|---|
| | $R_m$ % | F m/s |
| with circulation | 53 | $6.1 \times 10^{-5}$ |
| without circulation | 62 | $7.8 \times 10^{-5}$ |
| Millipore | 55 | $7.2 \times 10^{-5}$ |

Without circulation the best intermediate layer formation was obtained, a clearly higher salt retention being found in respect of the Millipore filter. The membrane thus formed was found to be substantially leak-proof.

EXAMPLE II

In this experiment it was determined, in how far the whether or no application of a layer, whose particle size is very small in respect of the underlying layer, affects the membrane properties, which membrane material is the same as that used in Example I. For the underlying layer again "Diatomite 125" was used and for the very small particles carbon black "ISAF" (made by AKZO Chemie-Amsterdam).

In Table B the results are summarized:

TABLE B operating pressure: $50 \times 10^5 N/m^2$
NaCl conc.: ca. 1.3 – 1.4 kg/m³
Temperature: 19 – 20° C.

| Intermediate layers | | Membrane properties after 7 hours | |
|---|---|---|---|
| 1st layer | 2nd layer | Rm % | F m/s |
| 1 gm. Diatomite 215 | — | 57 | $6.3 \times 10^{-5}$ |
| 1 gm. Diatomite 215 | 0.3 gm. carbon black | 73 | $6.9 \times 10^{-5}$ |

So, application of the layer with very small particles yields a surprising improvement: The average particle diameter of the carbon black is 26 nm, the ratio thus amounting well over 1:100. Herewith, too, a substantially leak-proof membrane was obtained.

EXAMPLE III

With the underlying layer consisting of "Diatomite 215" the influence was determined of various type of small particles, the building-up on the supporting tube being effected, without the fluid circulating.

The results are stated in Table C.

TABLE C

Operating pressure: $50 \times 10^5 N/m^2$
NaCl conc.: ca. 1.3 – 1.4 kg/m³
Temperature: 19 – 20° C.

| Intermediate layers | | Membrane properties after 7 hours | |
|---|---|---|---|
| 1st layer | 2nd layer | Rm % | F m/s |
| 1 gm. Diatomite 215 | 0.3 gm. Aerosil 200 | 70 | $8.4 \times 10^{-5}$ |
| 1 gm. Diatomite 215 | 0.3 gm. Carbon black | 73 | $6.9 \times 10^{-5}$ |

So, with "Aerosil 200" approximately the same salt retention is obtained as with carbon black.

EXAMPLE IV

This time, as a membrane material the macromolecule sodium alginate was applied, whereas for comparison as the layer with particles having the largest diameter besides "Diatomite 215" also glass fibres, having an average fibre diameter of 0.1–0.2 μm ("Micro-fibre 102") and glassy silicates, having an average particle diameter of 3.9 μm ("Perlite 418") were used and as second layer "Aerosil 200" or carbon black. For the membrane formation it is found to be essential that the sodium alginate is added together with the material for the layer having the smallest particle diameter.

Just like in Example I the test was also repeated utilizing a Millipore filter.

The results have been specified in Table D:

TABLE D

Operating pressure: $50 \times 10^5$ N/m$^2$
NaCl conc.: ca. 1.4 kg/m$^3$
Temperature: 19 – 20° C.

| Intermediate layer | | Ratio of the | Membrane properties after 23 hours | |
|---|---|---|---|---|
| 1st layer | 2nd layer | Particle Sizes | Rm % | F m/s |
| 1 gm. Diatomite 215 | 0.5 gm. Aerosil 200 | 1 : 225 | 58 | $2.5 \times 10^{-5}$ |
| 1 gm. Perlite 418 | 0.5 gm. Aerosil 200 | 1 : 325 | 55 | $2.7 \times 10^{-5}$ |
| 1 gm. Micro-Fiber 102 | 0.5 gm. Aerosil 200 | 1 : 12.5 | 55 | $2.1 \times 10^{-5}$ |
| 1 gm. Diatomite 215 | 0.5 gm. Carbon black | 1 : 104 | 55 | $4.2 \times 10^{-5}$ |
| Millipore | | — | 57 | $1.4 \times 10^{-5}$ |

With substrata of different natures a higher water flux is found than when using a "Millipore" filter. So, for the intermediate layer having the largest particle diameter also small fibres can be used instead of granulated particles.

We claim:

1. An improved device for effecting reverse osmosis, provided with a dynamically formed membrane, which is composed of a porous supporting device, an intermediate layer of an inert material consisting essentially of a member selected from the group consisting of glass fibers and asbestos fibers that is hardly or not deformable and a layer of membrane-forming material, wherein the improvement comprises that on the intermediate layer a second layer comprising granular inert material selected from the group consisting of silicon dioxide and carbon black is provided, of a substantially smaller diameter, the ratio between the particle diameter of this last mentioned material and that of the intermediate layer being between 1:10 and 1:1,000.

2. A device according to claim 1, wherein the granular inert material is provided on to the intermediate layer as a simple layer.

3. A device according to claim 1, wherein the granular material is provided on to the intermediate layer blended together with the membrane-forming material.

4. A device according to claim 1, wherein the first intermediate layer comprises non fibrous inert granular material and the ratio between the particle diameter of the granular material deposited on to the intermediate layer and the granular material of the intermediate layer is between 1:50 and 1:1,000.

5. An improved method for preparing a dynamic membrane device according to claim 1, wherein first an intermediate layer and thereafter a layer of membrane-forming material is deposited on to a porous supporting device by means of a fluid flow, the improvement comprising that the inert material that is hardly or not deformable for the formation of the first intermediate layer consisting essentially of a member selected from the group consisting of glass fibers and asbestos fibers and the inert granular material selected from the group consisting of silicon dioxide and carbon black to be deposited on the first intermediate layer are deposited in a first and a second layer, the ratio between the average particle diameter of the inert granular material of the second layer and the smallest average diameter of the particles of the first layer, being between 1:10 and 1:1,000.

6. A method for preparing an improved device according to claim 5, an intermediate layer of inert particles and a layer of membrane-forming material being deposited on to a porous substrate, the improvement comprising that the inert granular material having the smallest diameter to be deposited on the (first) intermediate layer is deposited on to the intermediate layer, simultaneously and blended with the membrane-forming material, the ratio between the particle diameter of the inert granular material and the average particle diameter of the (first) intermediate layer being between 1:10 and 1:1,000.

* * * * *